United States Patent
Renner

(10) Patent No.: US 9,724,961 B2
(45) Date of Patent: Aug. 8, 2017

(54) WHEEL MADE OUT OF FIBER REINFORCED MATERIAL AND PROCEDURE TO MAKE AN ACCORDING WHEEL

(71) Applicant: MUBEA CARBO TECH GMBH, Salzburg (AT)

(72) Inventor: Christoph Renner, Gosau (AT)

(73) Assignee: Mubea Carbo Tech GmbH, Salzburg (AT)

( * ) Notice: Subject to any disclaimer, the term of this patent is extended or adjusted under 35 U.S.C. 154(b) by 359 days.

(21) Appl. No.: 14/363,732

(22) PCT Filed: Dec. 6, 2012

(86) PCT No.: PCT/EP2012/074708
§ 371 (c)(1),
(2) Date: Jun. 6, 2014

(87) PCT Pub. No.: WO2013/083729
PCT Pub. Date: Jun. 13, 2013

(65) Prior Publication Data
US 2014/0346845 A1    Nov. 27, 2014

Related U.S. Application Data

(60) Provisional application No. 61/567,442, filed on Dec. 6, 2011.

(51) Int. Cl.
*B60B 5/02* (2006.01)
*B60B 3/00* (2006.01)
(Continued)

(52) U.S. Cl.
CPC ............ *B60B 5/02* (2013.01); *B60B 3/004* (2013.01); *B60B 3/008* (2013.01); *B60B 7/0066* (2013.01);
(Continued)

(58) Field of Classification Search
CPC ....... B60B 5/02; B60B 7/0066; B60B 7/0086; B60B 3/004; B60B 5/008; B60B 7/02066;
(Continued)

(56) References Cited

U.S. PATENT DOCUMENTS 2,584,142 A * 2/1952 Lyon .................. B60B 7/04
301/37.39
3,369,843 A  2/1968 Prew
(Continued)

FOREIGN PATENT DOCUMENTS

DE  198 41 779 A1  5/2000
EP  1 319 526 A2  6/2003
(Continued)

*Primary Examiner* — S. Joseph Morano
*Assistant Examiner* — Jean Charleston
(74) *Attorney, Agent, or Firm* — Pauley Erickson & Kottis

(57) ABSTRACT

The invention is directed to a wheel (1) which comprises a rim (4) and a thereto connected spoke structure (3) made out of fiber reinforced plastic material. An insert (2) is embedded in the fiber reinforced material at the center of the spoke structure (3). The insert (2) protrudes in at least one region above the surface of the fiber reinforced plastic material (16) forming at least one contact area (10, 14, 5).

26 Claims, 11 Drawing Sheets

(51) Int. Cl.
  *B60B 7/00* (2006.01)
  *B60B 7/06* (2006.01)
  *B60B 3/02* (2006.01)
(52) U.S. Cl.
  CPC ............ *B60B 7/0086* (2013.01); *B60B 7/066* (2013.01); *B60B 3/02* (2013.01); *B60B 2310/204* (2013.01); *B60B 2900/711* (2013.01)
(58) Field of Classification Search
  CPC  B60B 2900/711; B60B 3/02; B60B 2310/204
  USPC ............ 301/64.703, 64.201, 64.202, 64.203, 301/64.101, 95.101, 64.701
  See application file for complete search history.

(56) References Cited

U.S. PATENT DOCUMENTS

| | | | |
|---|---|---|---|
| 3,811,737 A | 5/1974 | Lejeune | |
| 4,072,358 A | 2/1978 | Ridha | |
| 4,416,926 A * | 11/1983 | Maglio | B60B 7/00 264/46.7 |
| 4,900,097 A | 2/1990 | Kostov et al. | |
| 5,277,479 A | 1/1994 | Koyama et al. | |
| 6,470,936 B2 * | 10/2002 | Pauc | B60B 3/02 152/379.5 |
| 6,520,595 B1 * | 2/2003 | Schlanger | B60B 1/003 301/110.5 |
| 2007/0158997 A1 * | 7/2007 | Raymond | B60Q 1/326 301/37.21 |
| 2007/0164853 A1 * | 7/2007 | Matsuda | B60T 8/1725 340/438 |
| 2008/0150348 A1 * | 6/2008 | Douglas | G01M 1/32 301/5.21 |
| 2010/0019564 A1 * | 1/2010 | Theuer | B29C 70/347 301/64.703 |
| 2010/0127559 A1 * | 5/2010 | Racicot | B60B 3/16 301/37.101 |
| 2012/0049610 A1 * | 3/2012 | Lew | B60B 21/08 301/95.103 |

FOREIGN PATENT DOCUMENTS

| | | |
|---|---|---|
| FR | 2.113.996 | 6/1972 |
| GB | 1372357 | 10/1974 |
| JP | 1-215601 | 8/1989 |
| JP | H02-128958 A | 5/1990 |
| JP | 2010-508200 A | 3/2010 |
| WO | WO 94/22615 | 10/1994 |
| WO | WO 94/22679 | 10/1994 |
| WO | WO 2006/097856 A2 | 9/2006 |
| WO | WO 2011/000070 A1 | 1/2011 |

* cited by examiner

WHEEL MADE OUT OF FIBER REINFORCED MATERIAL AND PROCEDURE TO MAKE AN ACCORDING WHEEL

BACKGROUND OF THE INVENTION

Field of the Invention

The invention lies in the field of wheels made out of fiber reinforced material for passenger vehicles such as cars, motorcycles, etc.

Discussion of Related Art

Polymeric composite materials became popular around 1970. As their name denotes composite materials are a compound of fibrous material which provide mechanical capacity and a surrounding matrix material in which the fibers are embedded and which is responsible for bonding, support and protection of the fibers. The mechanical capacity can be significantly increased in that the fibers are oriented in the direction of the occurring load. Depending on the field of application, carbon fibers, glass fibers or Kevlar® fibers or a mixture thereof is commonly used. The fibers are processed either in dry or impregnated form. One advantage of composite material is the low specific weight compared to metal alloys. Wheels made out of composite material offer significant weight saving compared to similar wheels made out cast aluminum or steel. A further advantage is the higher design flexibility compared to wheels made out of metal. In addition, less energy is necessary for the process of making the wheel.

U.S. Pat. No. 3,369,843 published on 20 Feb. 1968 is directed to a laminated vehicle wheel. The wheel comprises a relatively flat, axle-receiving hub section and an outer laterally extending rim. The hub and the outer rim sections are integrally formed of a plurality of radially extending triangular plies of reinforced synthetic resin material diverging outwardly from said hub section in circumferentially overlapping relation to one another.

GB 1 372357 published on 30 Jan. 1974 describes a vehicle road wheel, which comprises a body and rim formed from a cellular rigid plastics core enveloped in a skin of plastics material. A reinforcing element, e.g. a steel disc, may be embedded at least partly in the body, the element being secured to the core by mechanical locking (e.g. by the provision of holes forming a key for the core material) or by bonding, or being bonded on one surface to the skin. The core may be made of injection moldable material (e.g. an ABS copolymer, a polyurethane, a nylon, a polyethylene, or polypropylene), or castable material (e.g. a polyurethane, an unsaturated polyester or an epoxy resin). The skin may be made of injection moldable material (e.g. an acetal polyamide, a polyphenylene oxide, a polycarbonate, a polysulphone, a polyurethane, or polypropylene), which may be fiber reinforced, or may be formed from a material suitable for skin production using lay-up techniques, e.g. a fiber reinforced polyester or epoxy resin, the fibers in the skin material being glass, carbon, boron, asbestos or metal.

U.S. Pat. No. 5,277,479A published on 11 Jan. 1994 describes a resin wheel of a one piece type. The wheel comprises a rim and a disk molded integrally. A portion between an axle hole of the disk and the rim is in a form of a blind plate with no holes excepting for bolt holes. The wheel is formed by injection molding or injection compression molding of a fiber reinforced thermoplastic resin.

U.S. Pat. No. 4,900,097A published on 23 Aug. 1988 describes a car wheel made of engineering polymer material. The wheel is connected to a disc provided with holes for the fixing components. Between the wheel disc and the car hub, a heat insulating plate is inserted. In the zone of each hole for the fixing components a plurality of axially, uniformly arranged pins are present, the faces of which are in contact with supporting plates, disposed on both sides of the disc. The coefficient of linear expansion of the pins is equal to that of the fixing components.

U.S. Pat. No. 4,072,358A published on 7 Feb. 1978 describes a compression molded cut-fiber reinforced plastic wheel for pneumatic tires. A polyimide plastic containing about 65 percent by weight of cut glass fiber is compression molded.

U.S. Pat. No. 3,917,352A published on 4 Nov. 1975 describes a wheel having a fiber reinforced plastic central hub portion. A rim is formed to the hub portion for receiving a tire. The rim comprises first and second circumferential, tire engaging bead regions on opposite sides of the rim. The rim comprising a plurality of resin encased filament lengths extending continuously from one bead region over the hub portion to the opposite bead region.

U.S. Pat. No. 3,811,737A published on 21 May 1974 describes a wheel of reinforced resin, which comprises a disc formed with a plurality of fastening holes. Plates of rigid material are embedded in the disc and formed with bores aligned with the fastening holes. The plates have an outer face that extends out at least as far as the immediately surrounding portions of the outer face of the disc.

WO 06097856 published on 21 Sep. 2006 concerns a vehicle wheel comprising a rim for receiving a tire and a spoke unit or a wheel disc connecting the rim to the hub. The rim is made of plastic material and the spoke unit or the wheel disc of metal. The rim is connected to the spoke unit or wheel disc by form-closure and/or by force-closure of the material. The invention aims at enabling the wheel disc to be accurately positioned relative to the rim base and at providing a wheel with an attractive design. Therefore, the spoke unit, or the wheel disc are connected via at least one connecting element guided through the rim base and the connecting element is housed in the spoke unit or the wheel disc so as to be completely covered by a tire or by the spoke unit or the wheel disc.

WO 94226A published on 13 Oct. 1994 shows a method of how to build wheels out of metal with varying designs using the same basic wheel structure in combination with individual metal cover elements. The shown cover elements only cover the wheels' hub and spoke structure of the basic wheel structure and do not fully extend to the peripheral rim of the wheel. Hence the design of the peripheral rim is not affected by the cover elements.

WO 11 000070A published on 6 Jan. 2011 shows a wheel made out of a polymeric composite material comprising a homogeneous mixture of a thermoplastic matrix and synthetic fibers, made in a single piece by an injection process. The document further describes the use of different types of metallic inserts in the wheel's central region in order to reinforce the connection of the wheel to a vehicle.

U.S. Pat. No. 7,296,860B published on 20 Nov. 2007 shows a protective ring which is fitted around the periphery of a rim. The aim of the invention is to protect light alloy wheels against damage on their side surfaces and to enhance the appearance of the rim. The protector therefore is impact-absorbing and can be built-up using multiple layers. The ring can be replaced after reaching a certain degree of damage, which can be indicated using a damage-indicative layer. The protection is essentially limited to the peripheral region of the wheel and does not extend to the central hub region.

Problems of existing wheel concepts made out of fiber reinforced materials are abrasion and other damage, contact corrosion, structural damage due to micro movement especially between the fixing bolts and the fibers.

Furthermore, in many cases the detection and assessment of damage in wheels made out of fiber reinforced material turns out to be difficult—if not even impossible—for the end-user. A main reason that external forces, such as impacting stones, can cause damage in underlying material while the material visible from outside stay intact. Therefore systems to indicate or highlight potential structural damage in a wheel made out of a fiber reinforced plastic are needed.

As well, for many methods used for the production of parts out of fiber reinforced materials, the tooling costs are relatively high. Hence, variations in the design of a wheel made out of such a composite material are in general relatively expensive if compared to e.g. wheels made out of conventional light metal alloys. Thus, methods are sought which allow inexpensive variations in wheel design.

Another problem which is common especially to relatively expensive types of wheels is that they are often prone counterfeiting and theft. Means to verify the authenticity of an original wheel as well as to identify a previously stolen wheel therefore are important for customer safety, as well as for crime prevention and law enforcement.

SUMMARY OF THE INVENTION

One object of the invention is to provide a wheel which avoids the problems known from the prior art as mentioned before. A further object of the invention is to provide a method to make an according wheel.

A wheel according to the present invention comprises a rim and a therein arranged spoke structure which is interconnected to the rim and is suitable to mount the wheel to a hub of a vehicle. The spoke structure is made out of fiber reinforced material. The rim comprises an inner and an outer bead suitable to engage with a tire. The rim may be made as a separate part out of fiber reinforced material or metal. In a preferred embodiment the rim and the spoke structure are made out of the same fiber reinforced material and are integrally connected to each other in one process step. Good results are achieved in that the fiber reinforced material is made by resin transfer molding (RTM). Alternative procedures may be appropriate, e.g. based on dry fibers and/or impregnated fibers (prepregs).

Normally the insert is made as a separate part which is inserted into the mold before and/or after the fibers are inserted. Afterwards the mold is closed and a resin material is introduced in a liquid form. The resin material is set by variation of the temperature and/or the pressure. Afterwards the mold is opened and the wheel is removed. Compared to the prior art, the invention provides the advantage that in general no post processing of the wheel is necessary.

In the center of the spoke structure a special type of insert is arranged, which is integrally connected to the disc, respectively the spoke structure and which transfers the occurring loads between the disc and the hub to which the wheel is affixed during operation. The insert is at least partially embedded in the fiber reinforced material. In a preferred embodiment, the insert comprises defined areas which are not covered by reinforced material. Said areas are foreseen to interact with the hub to which the wheel is mounted. If appropriate, the insert may be equipped with at least one opening or at least one surface to guide the flow of the resin during making of the wheel.

According to one aspect of the invention, the insert may be made out of a metal material or alternatively or in addition out of a ceramic material. The ceramic material may be a fiber reinforced ceramic as e.g. a ceramic matrix composite (CMC), which allows to further reduce the weight of the insert s if compared to a metal insert.

However, alternatively or in addition the insert may at least partially be made out of a plastic material, which in particular can be a fiber reinforced plastic material. Thus, the total weight of a wheel as well as its moment of inertia can be decreased further. Such a plastic-type of insert can e.g. be produced by an injection molding process, using a thermoplastic or thermosetting matrix material. Alternatively, an insert can be produced using a thermosetting matrix in a bulk molding compound (BMC) or a resin transfer molding (RTM) process. If required, the insert is produced by a conventional BMC or RTM process, followed by an additional final compression step in order to increase accuracy of dimensions and surfaces.

An insert may comprise at least one strengthening inlay (sub-insert) which is fully or partially embedded in the plastic material component of the insert. Said strengthening inlays would typically be used for the mounting of a wheel, e.g. as contact surfaces to a vehicle's hub and the screws used to fasten a wheel to a hub. It therefore may be advantageous to make the strengthening inlays out of a material which differs in mechanical and/or chemical properties from the plastic part of the insert. It may e.g. have a higher stiffness and strength than the plastic part of the insert. The at least one strengthening inlay may be made out of metal or another fibre reinforced material. Moreover, the inlays may be made out of a ceramic material, which may also be a fiber reinforced ceramic material.

In an embodiment, the wheel comprises a rim and a thereto connected spoke structure, which is made out of fiber reinforced plastic material. An insert is embedded in the fiber reinforced structure, preferably at the center of the spoke structure. The insert comprises at least one region, which protrudes above the surface of the fiber reinforced plastic material forming at least one contact area and which in general is not covered by fiber rein-forced material in a negative manner. The at least one contact area of the insert is arranged in a radial and/or axial direction to interact with corresponding surfaces of a hub onto which the wheel is fastened. The insert may comprise at least one fastening hole foreseen to receive a bolt for fastening of the wheel. If required one or more separate inserts may be provided to receive the fastening bolts. Depending on the field of application, the contact areas may be coated by a material. Normally a contact surface is arranged adjacent to at least on end of the fastening hole. The at least one contact area preferably is aligned to a spoke of the spoke structure. Other embodiments are possible, e.g. if the number of the spokes does not correspond to the number of the fastening holes. In a preferred embodiment, the insert comprises wing-like elements, which are protruding outwardly in the direction of the spokes of the spoke structure to evenly interact (exchange a force with) the spoke structure. In a preferred embodiment at least one bridge is arranged between two contact areas. The bridge is forming a recess to receive fiber reinforced plastic material. The fiber reinforced plastic material is arranged in said recess forming a loop around the bridge. The rim may be made out of fiber reinforced plastic material. The rim may be integrally connected to the spoke structure. If appropriate, the rim may at least partially be made out of metal.

In a preferred embodiment the wheel comprises a rim which is integrally connected to a spoke structure. A crown-like insert is embedded in the fiber reinforced material of the spoke structure. The insert comprises five fastening holes arranged around a center opening. On both ends of each fastening hole contact areas are present which are not covered by fiber reinforced material in a negative manner. These contact areas are foreseen to interact with the locking bolts on one side and with a hub of a vehicle. Inside the center opening the insert forms five radial contact areas which are aligned with the fastening holes. The wheel may comprise auxiliary openings which are arranged between the fastening holes. The openings may be used as holding means during production of the wheel.

In order to prevent galvanic corrosion phenomena, a wheel according to the invention may comprise electrically insulating layers in order to avoid (negative) contact between different materials.

To allow easy changes in wheel design and/or to protect the load-carrying part of a wheel against damage and to highlight potential damage of the wheel, the wheel may comprise a protective cover. The protective cover may be mounted on an inner and/or an outer side of a wheel and thus can have an influence on the design and appearance of the wheel. The protective cover can be made out of a single homogeneous material, such as a plastic material or metal. The protective cover may also be built-up of multiple layers, which may also comprise composite materials. In one embodiment a protective cover may comprise on its surface a fiber reinforced plastic material (e.g. a carbon fiber reinforced plastic) which can be covered by a finish but is still visible.

Normally the protective cover is interconnected to a wheel e.g. by an adhesive and/or a clamping device and/or a snap connection. The adhesive may have a color which differs from the color of the protective color and/or the wheel. Hence exposure of the adhesive film, e.g. due to excessive abrasion or damage of the protective cover will be visible. A protective cover may be detachably connected to a wheel. Hence, according to one aspect of the invention a damaged protective cover may be detached from a wheel e.g. by means of heat treatment of a heat-sensitive adhesive film between the protective cover and the wheel.

If appropriate, a protective cover may comprise air guide elements e.g. in the form of flaps or other aerodynamic elements which actively influence the aerodynamics of the wheel and/or the vehicle. For example such air guide elements may affect the airflow through the openings of the spoke structure of a wheel in order to enhance the cooling of the vehicle's break system. A protective cover comprising air guide elements may also enhance the aerodynamic properties of a car, e.g. by increasing the negative lift of a vehicle and/or decrease its drag.

A protective cover may include a damage indicating mechanism, which may indicate damage to the cover and related potential damage to the underlying wheel. Such a damage indicating mechanism may comprise a colored layer which in the undamaged state is e.g. covered (thus hidden) by an overlying layer. The colored layer may be made out of a homogeneous material, such as a polymer foil, or a fiber reinforced material containing fibers which differ in color from the fibers of the overlying layer. As contact with an obstacle (e.g. a curb) will usually cause scratching of the protective cover and hence also removal of the overlying layer, revealing the underlying colored layer. So such type of potentially harmful incident for a wheel would be clearly indicated by the appearance of the colored layer. As a consequence, the wheel could be tested in order to verify its structural integrity. If the structural integrity of the wheel is not decreased, a protective cover can be repaired or replaced by a new one. Alternatively or in addition, the wheel may comprise a damage indicating mechanism.

The wheel and/or the protective cover may comprise an outer layer of material which is integrally connected to the respective part. If appropriate, the outer layer may be built up by preforming at least one layer of material in an auxiliary tool such that it corresponds at least partially to a surface of the wheel, respectively protective cover, followed by applying of fibers to said preformed layer of material and subsequent bonding of the fibers by a resin in a production tool to form the composite wheel, respectively protective cover. The preforming of the layer of (sheet) material may comprise heating and/or deep drawing in a deep drawing tool and/or extruding in an extruding tool and/or injection molding in an injection molding tool and/or blow molding in a blow molding tool. The performing may also take place in the production tool of a wheel and/or protective cover.

If appropriate, the wheel and/or protective cover may comprise multiple layers of material preformed in an auxiliary tool which are located at different sites of the wheel and/or protective covers. A first preformed layer may be located on the outer surface and rim of a wheel's spoke structure. A second preformed layer may be located on the surface of the rim well. A third preformed layer may be located on the inner surface of the spoke structure.

A preformed layer according to the invention may comprise means in order to indicate the presence, respectively absence of said layer. For an optically transparent and colorless preformed layer, these means may e.g. comprise fluorescence, such as the emission of visible light due to illumination by light with a wavelength in the non-visible spectrum.

The protective cover may comprise at least one impact-absorbing layer in order to absorb shock energy within the protective cover instead of transmitting it to the underlying wheel structure. Such a shock absorbing layer can e.g. be a hard foam structure or one or multiple layers of an aramid fabric.

Alternatively or in addition, the wheel and/and or the protective cover may comprise damage detecting means e.g. in the rim and/or in at least one spoke and/or in its central hub) region. Such damage detecting means allow constant and/or periodical and/or on-demand monitoring of a wheels structural integrity and thus failure detection. In one embodiment, failure indication means are positioned in the inner and/or outer beads or the rim. Depending on the field of application the damage detecting means may comprise optical fibers and/or electrical conductors.

To avoid crack formation, exposure of fibers and to increase structural competence it is preferable to form hems at edges of a wheel and/or protective cover by folding a lay-up over, instead of cutting it. In an embodiment of the invention, instead of being cut, the lay-up of the wheel and/or the protective cover may be folded and forms a hem at the edges of a wheel or protective cover. Hence, fibers are not cut and exposed at the borders of a part. This allows to enhance the look and mechanical properties of borders. An edge with a hem may be characterized by higher mechanical stiffness and strength as well as crack formation is hampered. Furthermore it may be used to form e.g. beads.

Alternatively or in addition, the wheel may comprise at least one label which provides information about the wheel and may contain means that allow to verify the authenticity of the wheel, respectively to identify a counterfeit wheel.

Such means may e.g. be serial numbers, security holograms or bar codes. In order to be visible from outside, such a label can for example be embedded in a transparent outer finish or between a transparent outer finish and a first layer of fibers.

Alternatively or in addition, the wheel may comprise at least one electronic device that may contain retrievable information about the wheel and which is embedded within the wheel such that it is neither visible nor accessible from outside without affecting the integrity of the wheel. Said electronic device can for example be a transponder (e.g. an RFID tag) that stores and provides a unique identifier which cannot be overwritten. Additionally or alternatively an electronic device may be used to record data e.g. to store data regarding the production history of a wheel and to log inspections and repairs during the lifetime of a wheel. Information stored in said transponder can be read and edited e.g. by a portable reading/writing device or a fixed data processing unit belonging to the vehicle where the wheel is mounted. An electronic device may also carry information regarding specifications of a wheel which may e.g. be used to ascertain its compatibility to a certain type of car and/or type of fastening screws and/or tire type and/or driving conditions (e.g. speed range and/or temperature range).

Other features and advantages of the invention will become apparent from the following drawings and descriptions of non-limiting embodiments of the invention.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
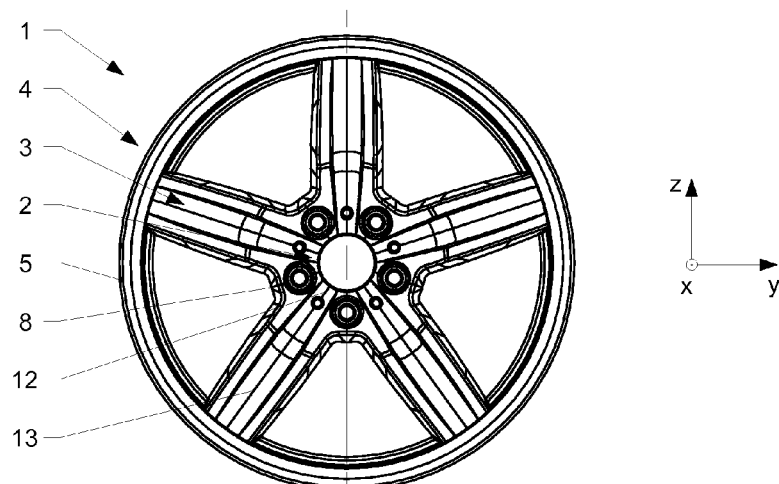
FIG. 1 shows a wheel according to the invention in a front view.
Figure 2:
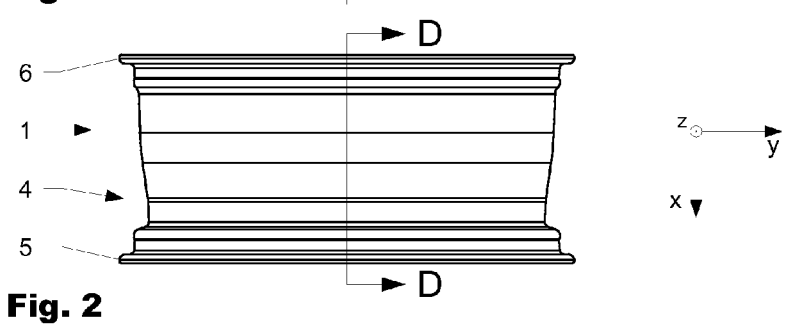
FIG. 2 shows the wheel in a top view.
Figure 3:
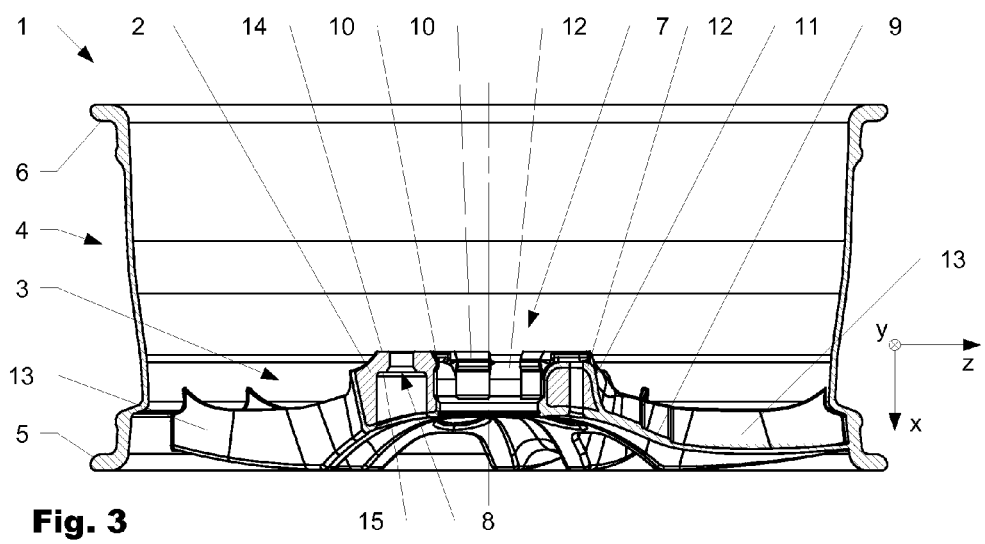
FIG. 3 shows a section view of the wheel along section line DD according to FIG. 2.
Figure 4:
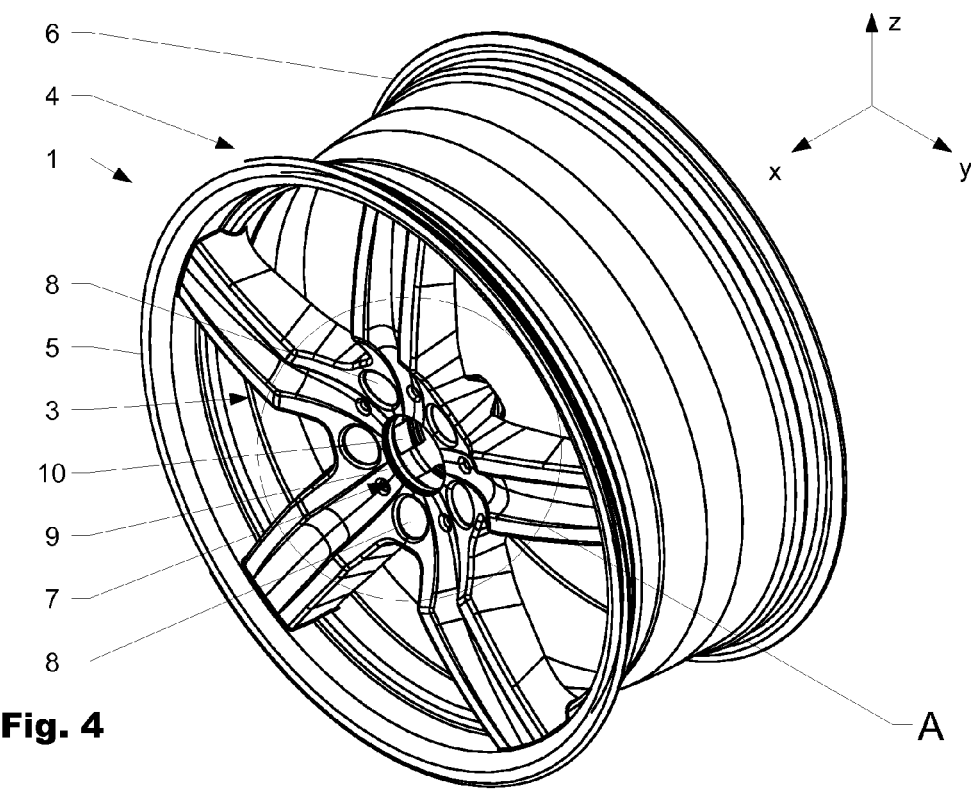
FIG. 4 shows the wheel in a perspective view.
Figure 5:
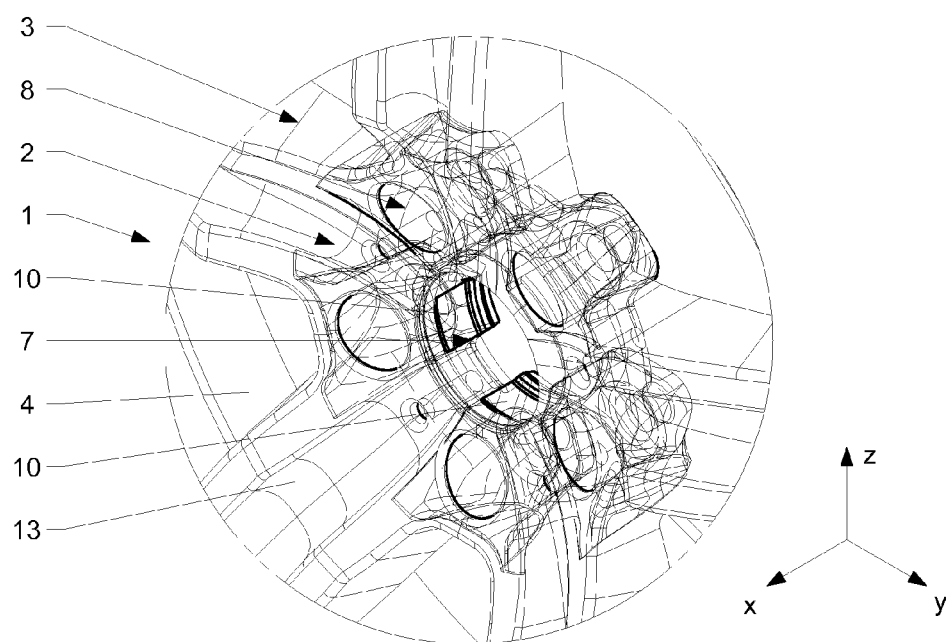
FIG. 5 shows the insert embedded inside of the fiber reinforced plastic material (detail A according to FIG. 4)
Figure 6:
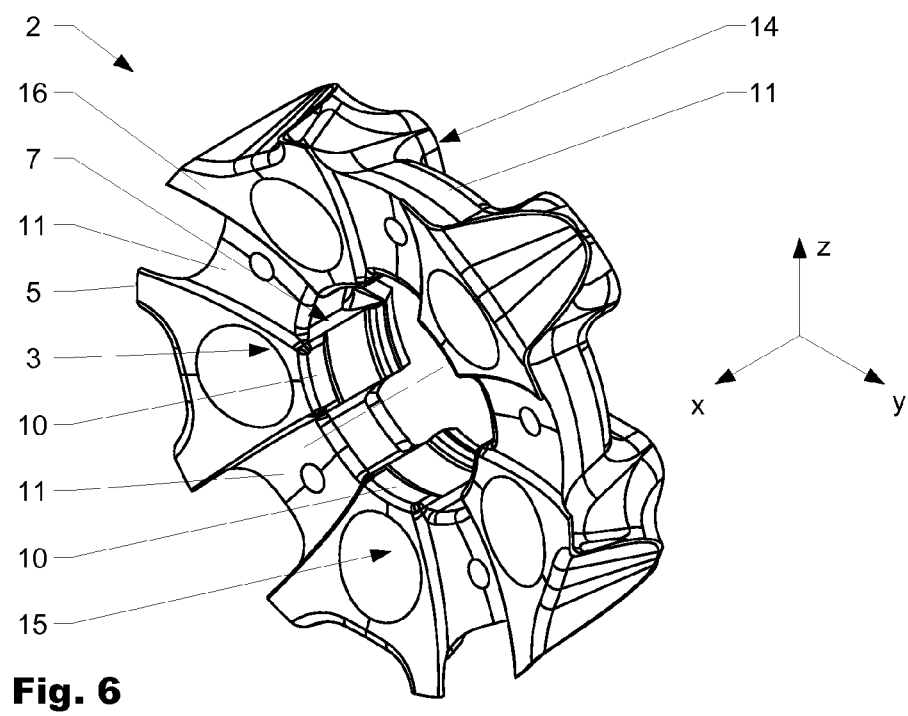
FIG. 6 shows a first separate insert in a perspective view from the front and above.
Figure 7:
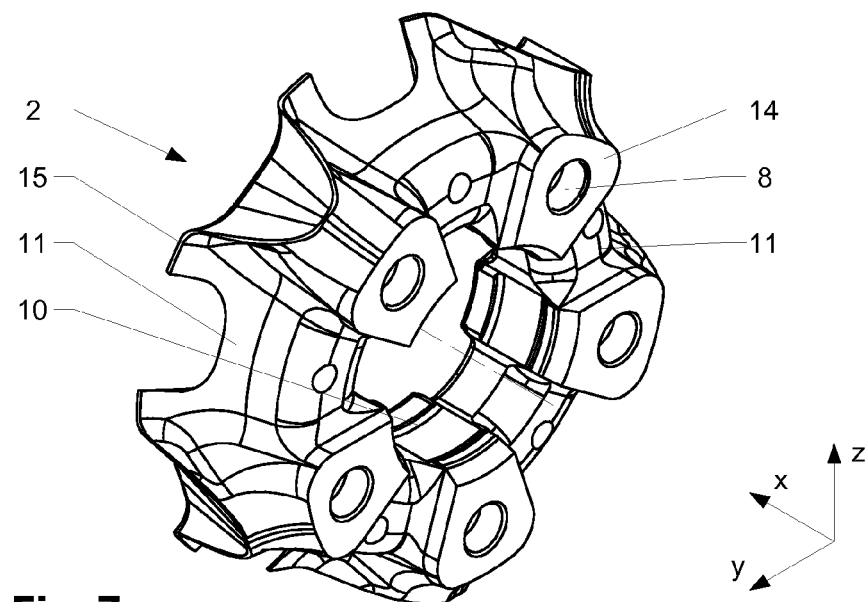
FIG. 7 shows the insert of FIG. 6 in a perspective view from the rear and above.
Figure 8:
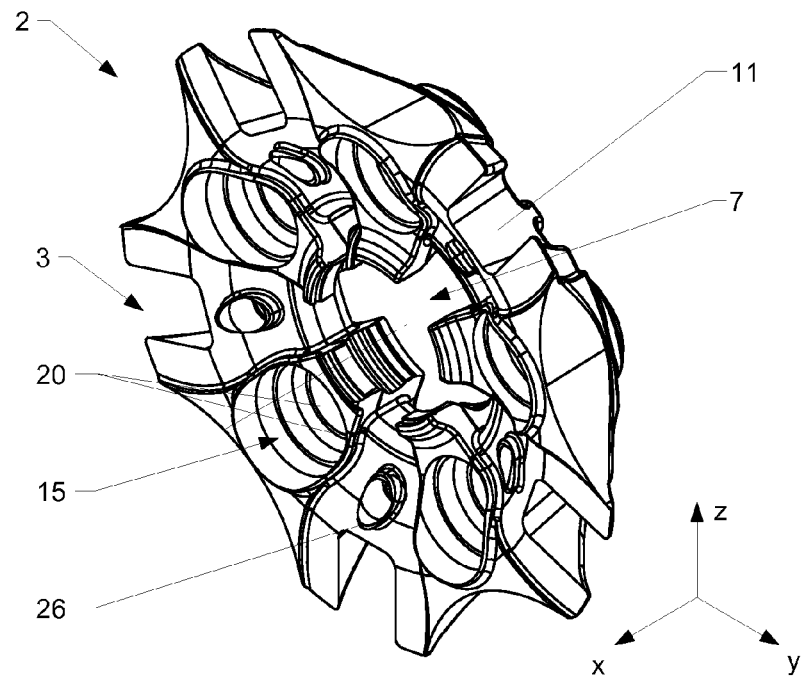
FIG. 8 shows a second separate insert, partially built out of a plastic material, in a perspective view from the front and above.
Figure 9:
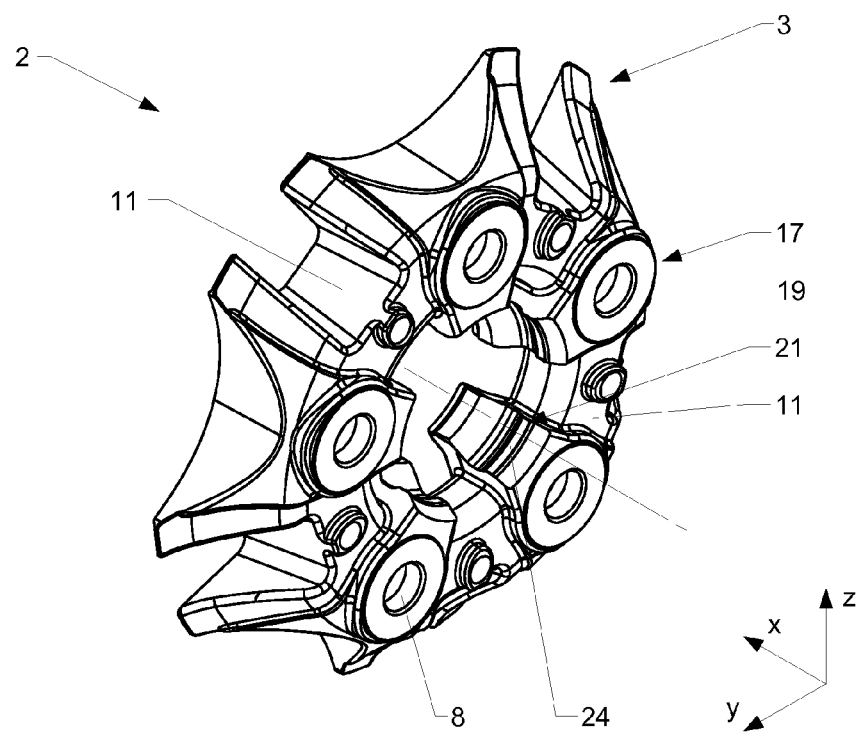
FIG. 9 shows the insert of FIG. 8 in a perspective view from the rear and above.
Figure 10:
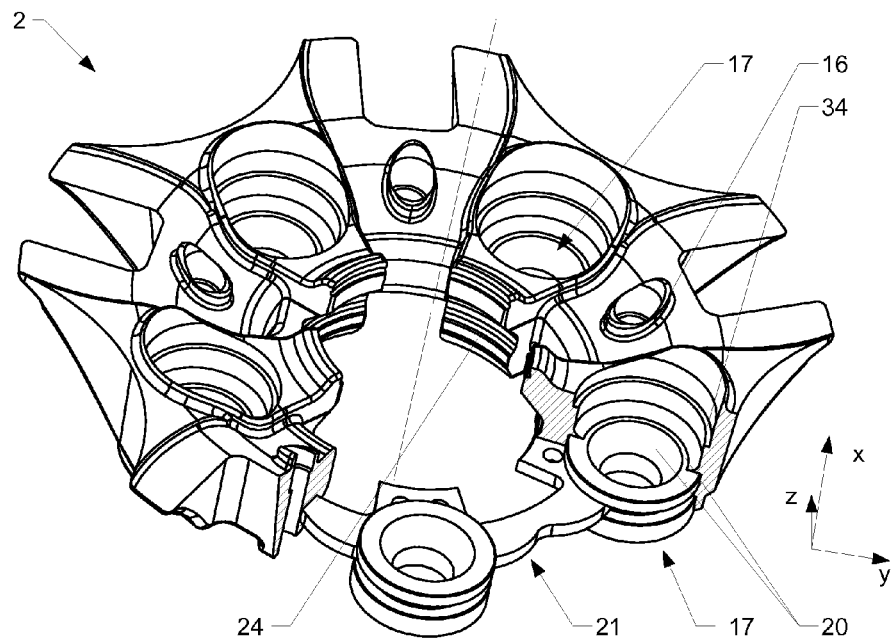
FIG. 10 shows the insert of FIG. 8 with part of the plastic material clipped for illustrative purposes in a perspective view from the front and below.
Figure 11:
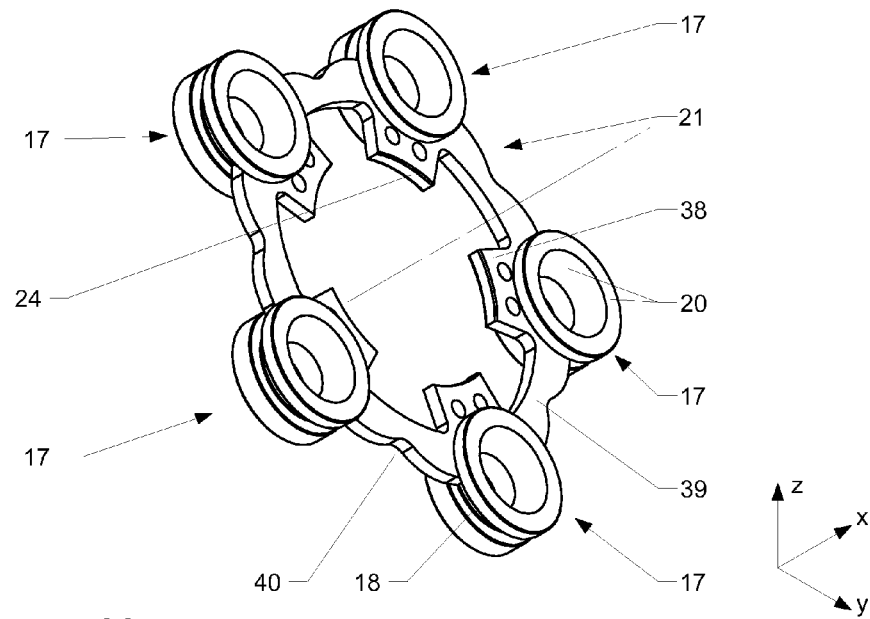
FIG. 11 shows reinforcing inlays in a perspective view from the front and below.
Figure 12:
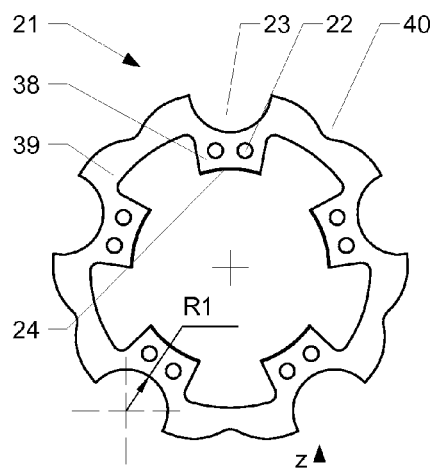
FIG. 12 shows an annular radial bearing element in a front view.
Figure 13:
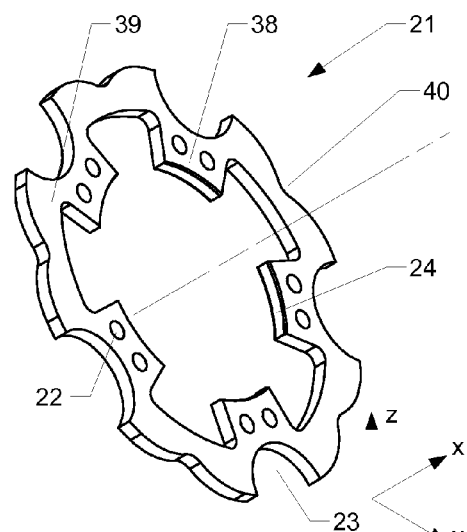
FIG. 13 shows an annular radial bearing element in a perspective view.
Figure 14:
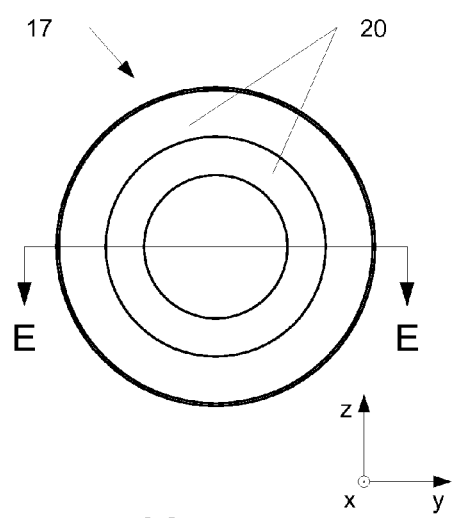
FIG. 14 shows a bushing in a front view.
Figure 16:
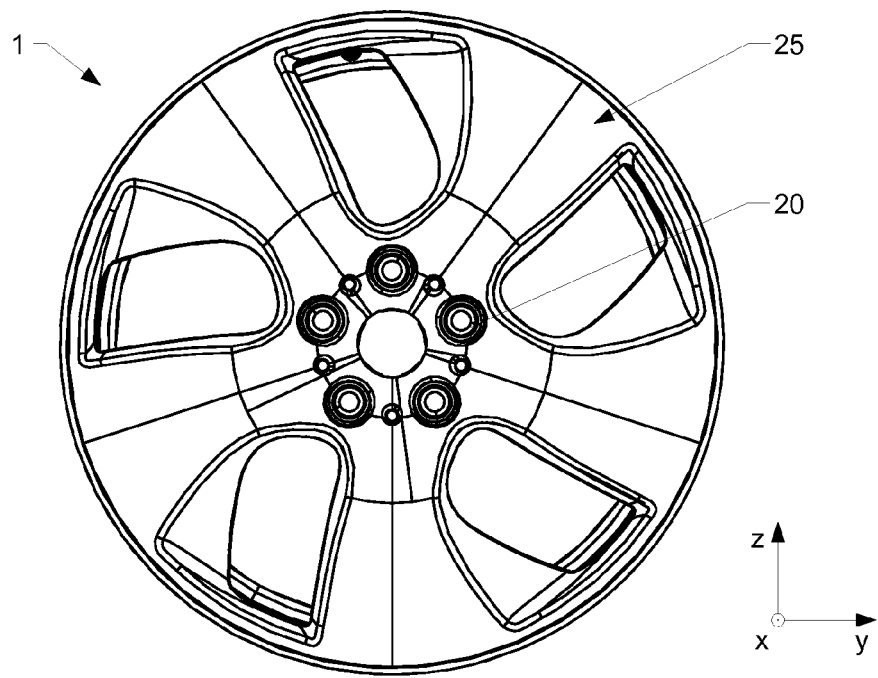
FIG. 16 shows a wheel with a protective cover in front view.
Figure 17:
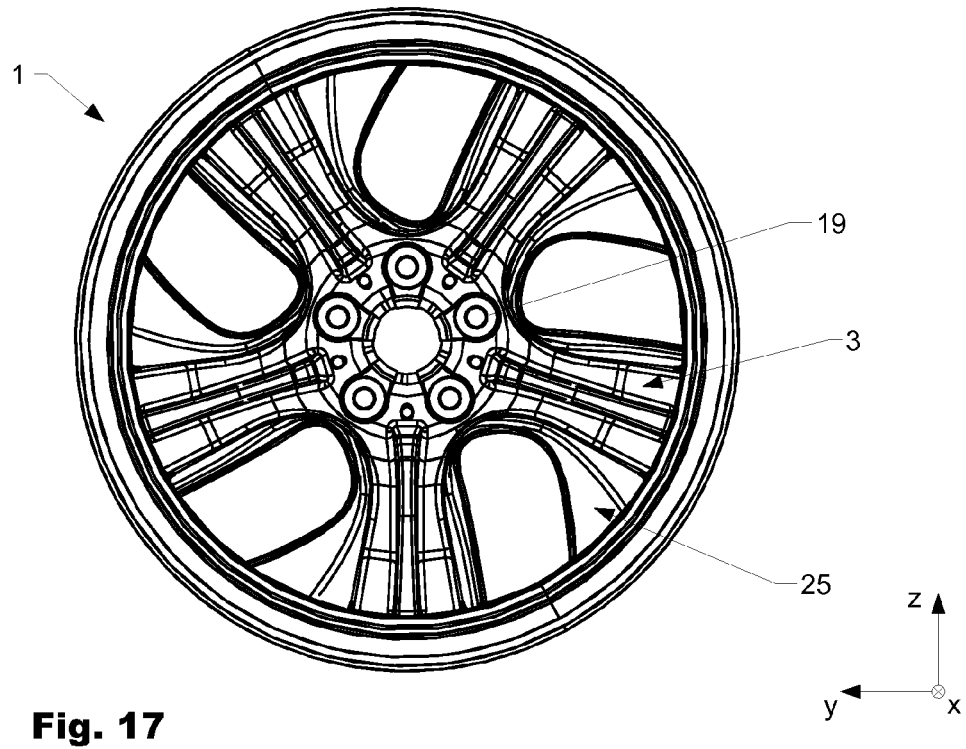
FIG. 17 shows a wheel with a protective cover in rear view.
Figure 18:
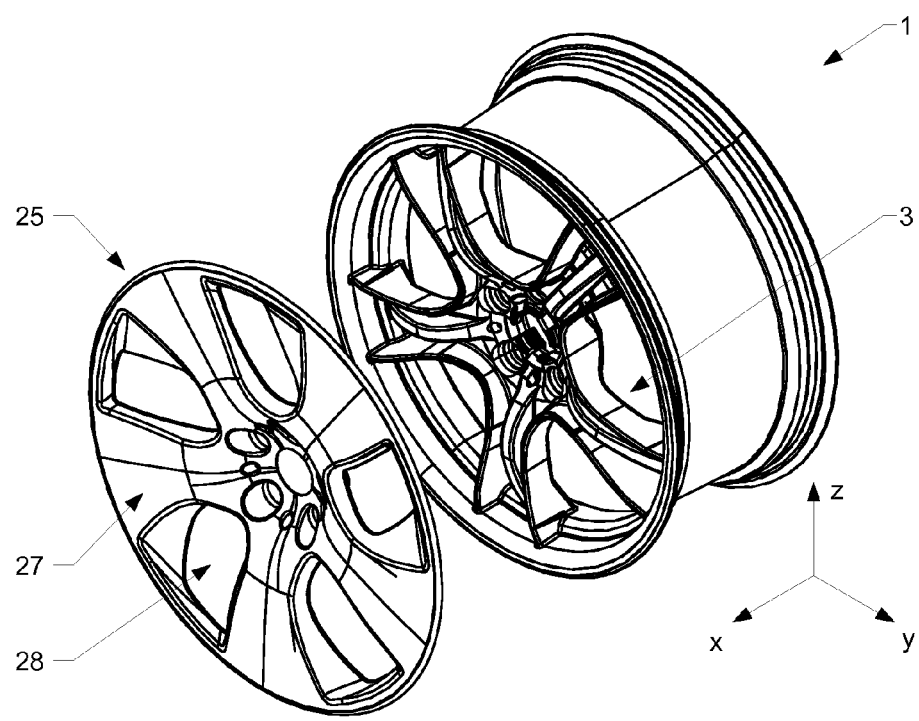
FIG. 18 shows a wheel with a detached protective cover in a perspective view from the front and above.
Figure 19:
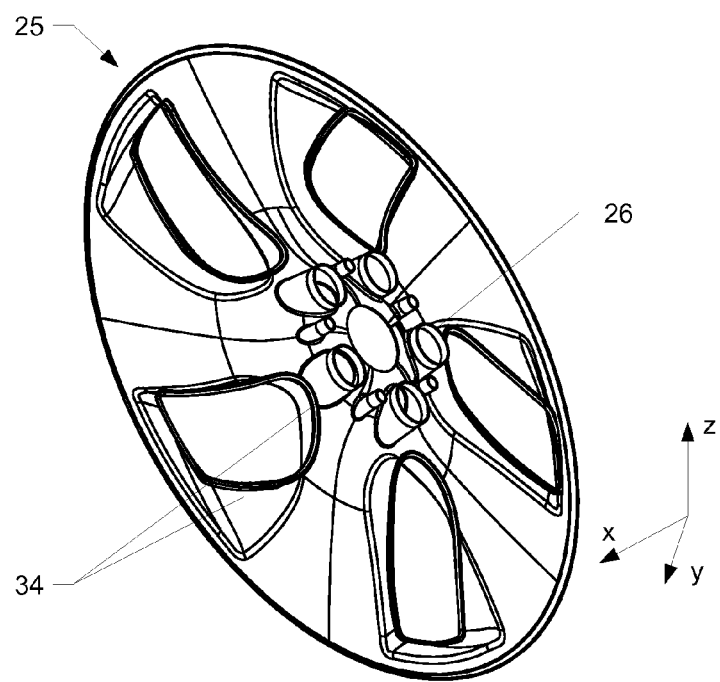
FIG. 19 shows a cover in a perspective view from the back and below.
Figure 20:
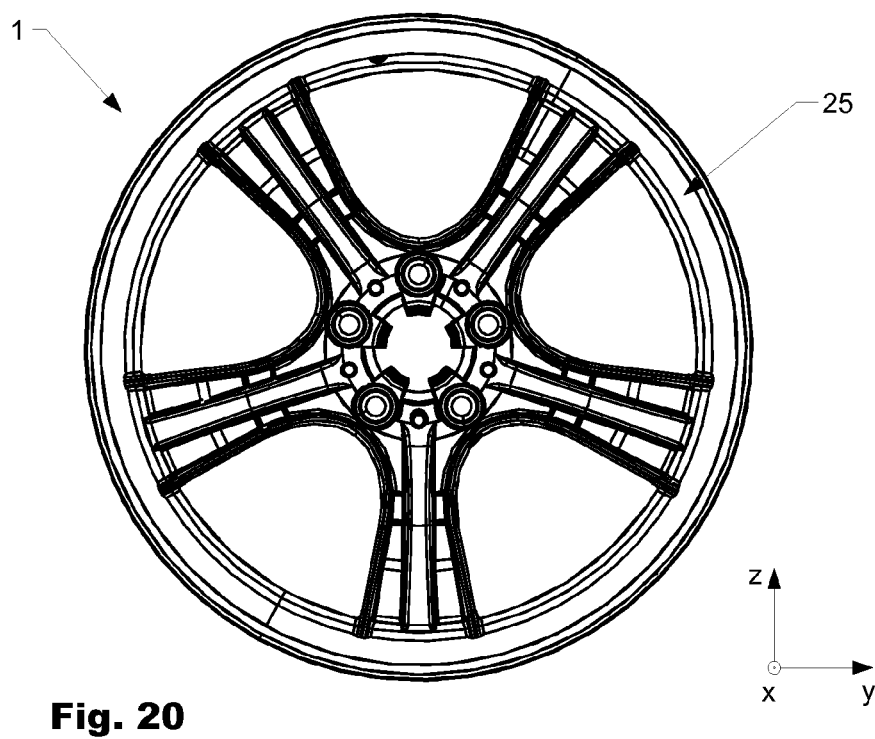
FIG. 20 shows a wheel with a protective cover in front view.
Figure 21:
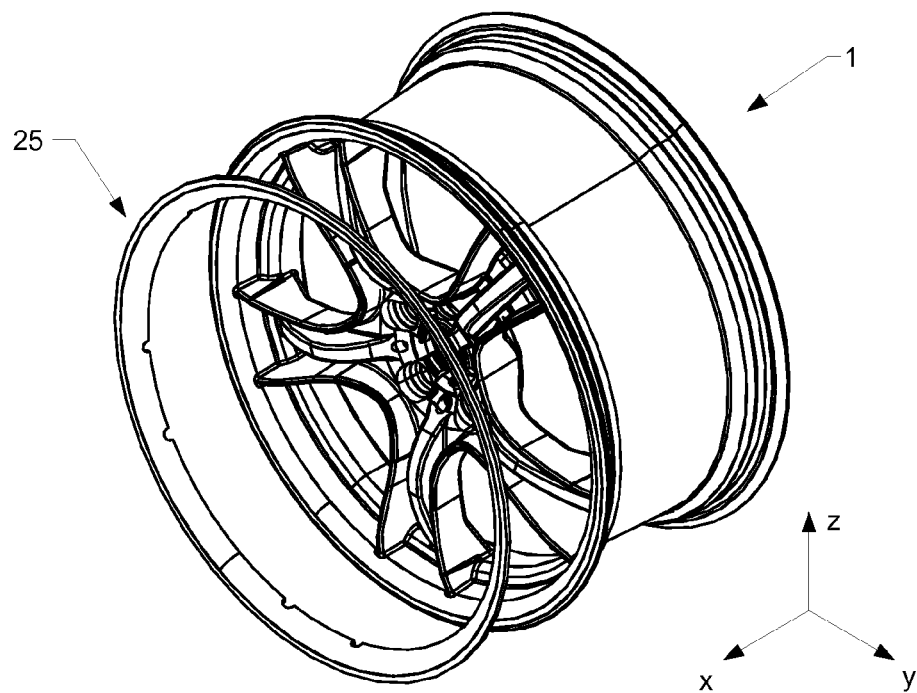
FIG. 21 shows a wheel with a detached protective cover in a perspective view from the front and above.
Figure 22:
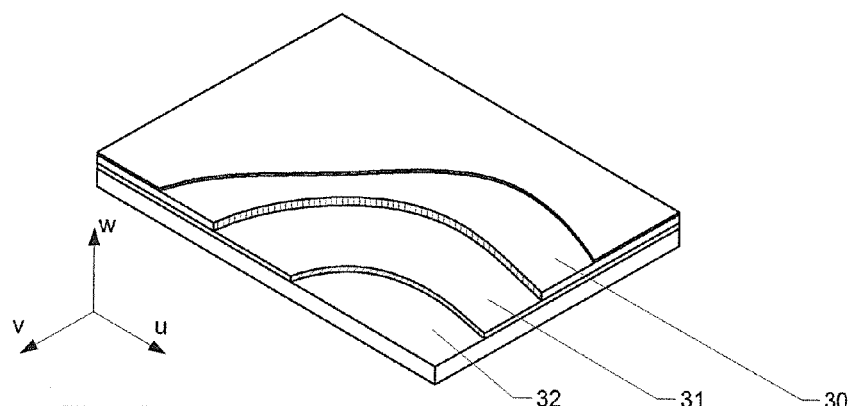
FIG. 22 schematically shows a first type of lay-up of a protective cover.
Figure 23:
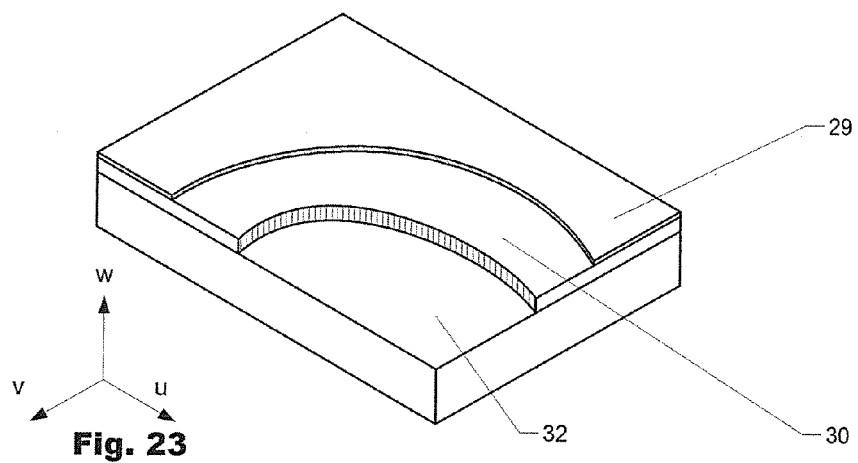
FIG. 23 schematically shows a second type of lay-up of a protective cover.
Figure 24:
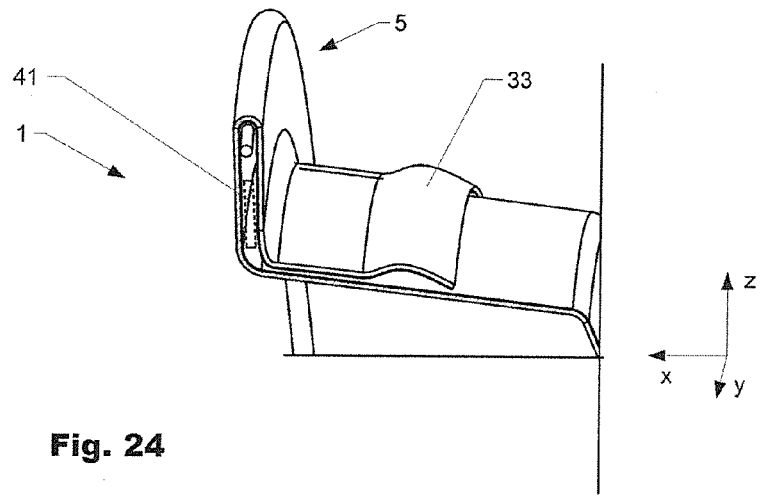
FIG. 24 schematically shows part of a rim cut in half in a perspective view.
Figure 25:
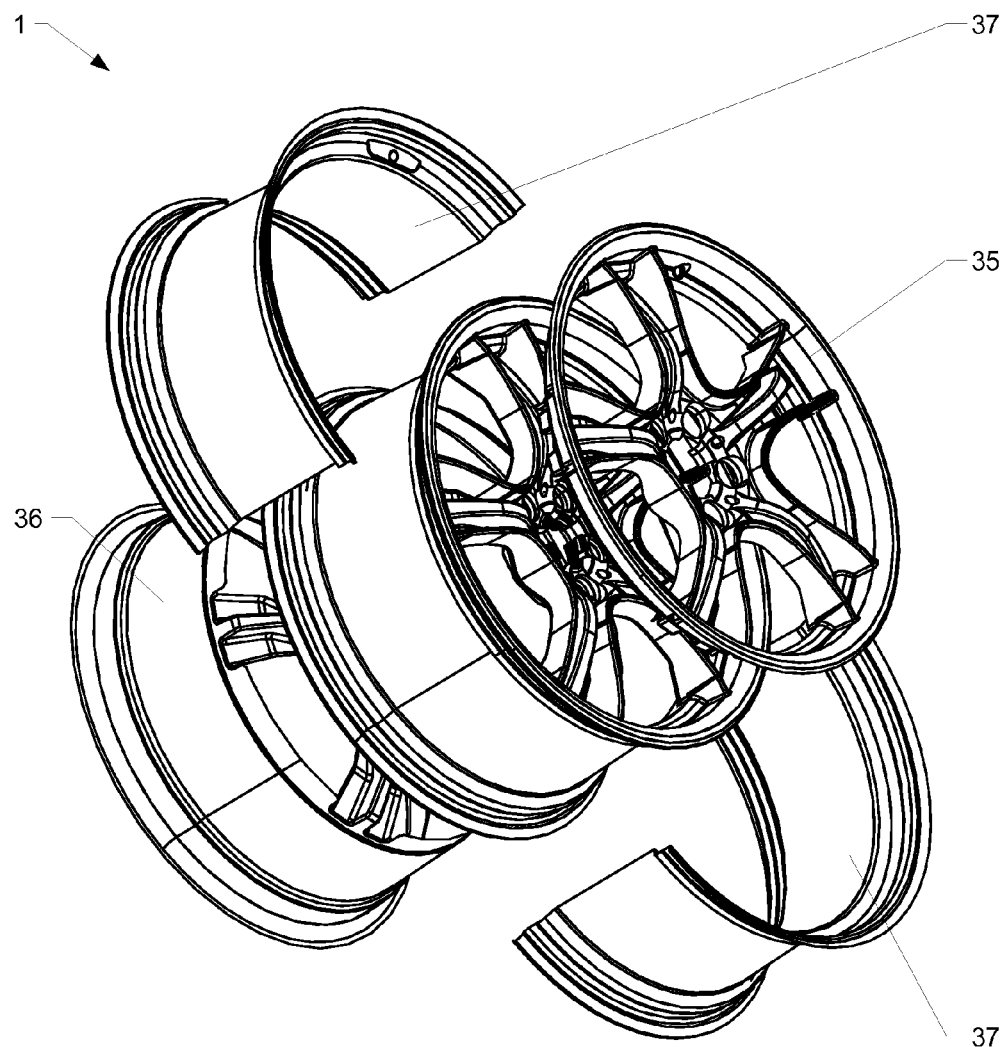
FIG. 25 schematically shows a wheel with preformed layers.

FIG. 1 shows a wheel 1 according to the present invention in a front view. FIG. 2 shows the wheel in a top view and FIG. 3 shows a section view along section line DD according to FIG. 2. FIG. 4 shows the wheel in a perspective view. FIG. 5 shows detail A according to FIG. 4 wherein an insert 2 is visible embedded in fiber reinforced material of the wheel 1. FIG. 6 shows a separated insert 2 of the wheel 1 in a perspective view from the front and above and FIG. 7 shows the insert in a perspective view from the rear and above. FIG. 8 and FIG. 9 show a second embodiment of an insert 2, at least partially built out of a plastic material, in a perspective view from the front and above respectively the rear and above. FIG. 10 shows the insert 2 of FIGS. 8 and 9 with part of the plastic material cut away for illustrative purposes in a perspective view from the front and below. FIG. 11 shows reinforcing inlays 17 & 21 in a perspective view from the front and below. FIG. 12 and FIG. 13 show an annular radial bearing element 21 in a front view and in a perspective view. In FIG. 14 a bushing-type inlay 17 can be seen in a front view and in FIG. 15 in cross section EE, as defined in of FIG. 14. In FIG. 16 and in FIG. 17 a wheel 1 with a protective cover 25 is shown in front and in rear view. In FIG. 18 a wheel 1 with a detached protective cover 25 is shown in a perspective view from the front and above. In FIG. 19 a protective cover 25 is shown in a perspective view from the back and below. In FIG. 20 another embodiment of a wheel 1 with an annular-type of protective cover 25 is shown in front view. In FIG. 21 a wheel 1 with a detached annular-type protective cover 25 is shown in a perspective view from the front and above. FIG. 22 and FIG. 23 schematically show two different types of a lay-up of a protective cover 25. FIG. 24 schematically shows part of a rim cut in half in a perspective view. In FIG. 25 a wheel 1 with preformed layers is shown.

The wheel 1 comprises a spoke structure 3, which is peripherally integrally connected to a rim 4. The rim 4 comprises an outer and an inner bead 5, 6 foreseen to be engaged with an inflatable tire (not shown in detail). The spoke structure 3 and the rim 4 are made out of fiber reinforced plastic material, e.g. by resin transfer molding (RTM). The insert 2 is preferably made out of metal alloy, e.g. aluminum or another suitable material. Depending on the field of application, the insert can be made out of a plastic material itself. The plastic material can be a fiber reinforced plastic material. In the shown embodiment, the insert 2 has a crown-like design.

The spoke structure comprises a center opening 7, which is surrounded by fastening holes 8. In the shown embodiment, the center opening 7 is foreseen to interact with a hub (not shown in detail). The fastening holes 8 are foreseen to receive bolts (not shown in detail) to affix the wheel 1 to the hub. The insert 2 is partially embedded in the fiber reinforced material of the spoke structure 3 at the center of the spoke structure. The insert 2 comprises first contact areas 10, which protrude in a radial direction above the fiber reinforced material 9 and reach into the center opening 7. The contact areas 10 are foreseen to center the wheel 1 in a radial direction with respect to the hub (not shown in detail). The hub comprises a corresponding surface to interact with the contact areas 10. The contact areas 10 in general are shaped at least partially cylindrically. The contact areas 10 are a tangential direction interconnected by bridges 11, which are fully embedded in the fiber reinforced material. As it can be seen in the section view according to FIG. 3, the fiber reinforced material 9 is forming a loop 12 surrounding the bridges 11.

As it can be seen in FIGS. 1-3 radially outside of each loop, respectively bridge, the fiber reinforced material 9 forms a spoke 13, which at its distal end is smoothly interconnected to the rim. By the alignment of the bridges 11, respectively the loops 12 and the spokes 13 of the spoke structure 3, a uniform and well balances distribution of the occurring forces are achieved. The insert 2 further comprises second and third contact areas 14, 15. The second contact area is arranged on the inside of the spoke structure 3 surrounding the fastening holes 8 and acting as an inner stop in axial direction. The third contact area 15 is in the shown embodiment arranged inside the fastening holes 8 and are foreseen to interact with the bolts (not shown in detail) used to fix the wheel on the hub. As it can be seen, the first, second and third contact areas locally protrude above the fiber reinforced material 9 in which the insert 2 is embedded. Thereby, it is achieved that only surfaces of the insert are in contact with the hub.

FIG. 5 shows detail A of FIG. 4. All visible lines of the spoke structure 3 and the rim 4 are shown as thin full lines. The visible lines of the insert 2 are shown as thicker full lines and the invisible lines of the insert 2 are shown in dash style. In this figure it is visible how the insert is embedded in the fiber reinforced plastic material.

In a method for making of the wheel 1 according to the invention a mold comprising an upper and a lower part for forming the spoke structure and the inside of the rim and at least two slidable side parts for forming the outside of the rim 4 (not shown in detail) is provided. The mold is opened such that fibers can be placed inside the mold in a predefined manner. As a next step the insert 2 is placed in the mold whereby the mold preferably comprises holding means (not shown in detail) to temporarily hold and position the insert in the mold in a defined position. After the insert has been set in the right position, additional fibers are arranged in the mold in a predefined manner forming loops 12 around the recessed bridges 11 of the insert 2. Then the mold is closed and a resin is introduced in the mold in a liquid form through injection openings. By variation of the pressure and the temperature and if appropriate the movement of the mold redundant resin is removed and the resin is cured. After the resin is sufficiently set the mold is opened and the wheel 1 is removed. If appropriate the insert is during production clamped between the upper and the lower part of the mold. If required an outer layer of material as described above is inserted in the mold. Instead of setting the fibers into the mold it is possible to apply the fibers and/or the insert to the outer layer of material outside of the mold. This offers the advantage that the outer layer of material, the fibers and/or the insert can be put in the mold as a package.

In FIGS. 8-10 a further embodiment of an insert 2 made out of a plastic material and/or ceramic material is shown. The plastic material may be a composite, e.g. a fiber reinforced plastic material, which may include short fibers with an aspect ratio of e.g. between 10 and 100. Using a short-fiber reinforced plastic makes is possible to produce the insert 2 by an injection molding process. Reinforcing fibers may e.g. be carbon, glass or aramid (Kevlar®) fibers and combinations of them. However, an insert 2 according to the invention is not limited to these types of fibers. As matrix for an insert 2 made out of a composite plastic material, both thermoplastic or thermosetting materials can be used, such as polyether ether ketone (PEEK), polyamide, epoxy resins, bismaleimides (BMI), polyetherimide (PEI) or others. By a special arrangement of inlets and outlets during the molding process, the alignment of fibers at certain regions of the insert can be controlled and hence anisotropic properties of the insert 2 be optimized for the load distribution in the central region of the wheel.

The insert 2 may comprise one or more strengthening inlays. In the embodiment as shown in FIGS. 8-10, the strengthening inlays (also strengthening inserts/elements) consist of multiple bushings 17, which are located at the fastening holes 8, as well as they consist of a radial bearing element 21, which is coaxially aligned with the wheel's rotation axis. The strengthening inlays are normally made out of material with a higher mechanical competence than the plastic material used for the main part of the insert 2. The strengthening inserts may be made out of a metal, such as a titanium or aluminum (and/or their alloys), a steel or a ceramic material (e.g. a CMC) or another type of polymer. The strengthening inlays may at least be partially covered with an electrically insulating material, such as a glass fiber reinforced plastic, in order to prevent galvanic corrosion phenomena between e.g. aluminum inlays and adjacent carbon fiber reinforced plastic. Alternatively or in addition galvanic corrosion may also be avoided by using high-grade steel or other inert metals and/or and insert 2 made out of a glass fiber reinforced plastic. As can be seen in FIGS. 8-10, the bushings protrude through the surface of the plastic part of the insert 2 and may be used as contact areas.

As can be seen in FIG. 8 and FIG. 10, said protrusion of the bushings 17 form outer strengthening areas 20 which are visible e.g. from the outer side of the wheel (in negative x-direction) and may be used as third contact areas 15 when mounting a wheel to a vehicle.

As can be seen in FIG. 9, the protrusions of the bushings 17 on the inner side of the insert form inner strengthening areas 19 which are visible from the inner side of the wheel (in positive x-direction) and may be used as second contact areas 14 e.g. to bolts and screws.

As can be seen in FIGS. 8-10 the protrusions of the radial bearing element 21 in radial direction to the middle of the center opening 7 form radial contact areas 24 which may be used as first contact areas 10 e.g. to a hub.

As can be seen in FIGS. 12-13, in the shown embodiment of the invention, the radial bearing element 21 has a flat annular shape based on a ring structure 39. The outer periphery of this ring 39 comprises multiple—essentially semi-circularly shaped—peripheral coupling recesses 23, each one able to accept one bushing 17, as shown in FIGS. 10-11. All peripheral coupling recesses 23 may have an inner radius R1. Alternatively at least two types of coupling recesses 23 with at least two different inner radii could be present (not shown in the figures). If preferred, the ring 39 may also comprise additional indentations 40 at its outer periphery. At the inner periphery of the ring 39, the radial bearing element 21 comprises legs 38 which extend in radial direction. When embedded in an insert 2, at least some of these legs 38 partially protrude the insert's 2 surface at the center opening 7 a form the radial contact areas 24 which may be used as first contact areas 10. In addition, the radial bearing element 21 also comprises multiple interlocking bores 22 located in the legs 38, which help to reduce its weight as well as to enhance the structural integrity of the whole insert 2.

Figure 15:
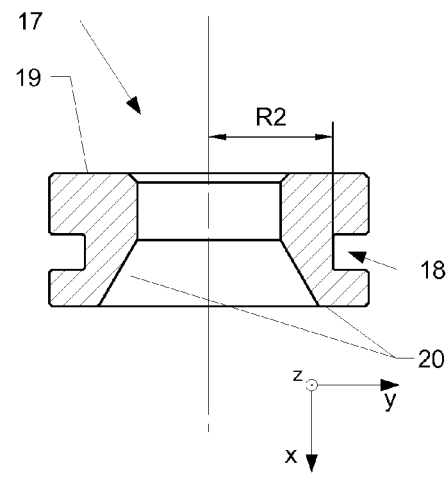
FIG. 15 shows cross section EE of FIG. 14.

As can be seen in FIGS. 10-11 and FIGS. 14-15, the bushings 17 in the shown embodiment of the invention have an essentially cylindrical shape. As shown in FIG. 15, each of the bushings comprises an outer rectangular annular groove 18 and is in axial direction (x-direction) confined by an inner tightening area 19 and an outer tightening area 20. The outer tightening area 20 may comprise a conical and/or a planar annular part. The rectangular annular groove may have an outer radius R2, which is equal to the inner radius R1 of the coupling recesses 23 in the radial bearing element 21. Alternatively also at least two different types of outer radii, corresponding to at least two different types of inner radii of two different types of coupling recesses 23.

In one embodiment (not shown in the Figures), the insert may comprise a one-piece inlay element which may be made out of e.g. a metal or a ceramic or a fiber reinforced ceramic or another composite material.

In an embodiment of the invention as shown in FIGS. 16-21, a wheel 1 comprises a protective cover 25 which may operatively connected to the wheel 1. A protective cover 25 may be mounted on the outer side of a wheel 1, as seen in FIG. 16. However according to the invention a protective cover 25 may also be mounted on the inner side or on both sides of a wheel 1. In one embodiment of the invention as shown in FIGS. 16-19, the protective cover 25 may cover most of the subjacent structure of the outer surface of the wheel 1. In particular the protective cover 25 may essentially covers the outer bead 5, the spoke structure 3 and the hub region, so that these parts of the underlying wheel are no more from a frontal direction (negative x-direction). Hence these parts are protected against damage e.g. due to curb stone contacts or stone-chip damage. In one embodiment of a protective cover 25 according to the invention, said protective cover 25 may comprise cover spokes 27 and cover openings 28, which allow to change the design of a spoked wheel 1. As can be seen in FIG. 19 a protective cover 25 according to the invention may comprise one or multiple adapter 26 means in order to operatively connect it to the subjacent wheel 1 structure. Such an operative connection may e.g. be obtained by e.g. adhesive films and/or clamping mechanisms and/or snap mechanisms.

An adhesive film may e.g. be a thermo-sensitive glue which shows a decreased adhesive strength when being heated above a certain maximum temperature and thus allows to detach the protective cover 25 from a wheel 1.

An adhesive film according to the invention may also have a color which differs from the color of the protective cover 25 and/or the wheel 1. If e.g. the protective cover 25 and the wheel 1 both are essentially black colored, the adhesive film may be colored e.g. in yellow or red. Alternatively or in addition, the adhesive film may also have fluorescent properties, hence e.g. emit visible light only if illuminated with light that has a specific wavelength in the non-visible spectrum. Hence damage of the protective cover 25 resulting to exposure of the adhesive film could easily be detected.

A protective cover 25 may also comprise air guide elements 34, which increase airflow through the cover openings 28 and thus enhance the cooling of a vehicle's brake system. Alternatively or in addition, the air guide elements 34 may increase the airflow through the cover openings 28 in order to increase the negative lift of a vehicle. Alternatively of in addition the air guide elements 34 may be specifically designed for a certain type of vehicle in order to optimize the vehicle's aerodynamic properties, such as total drag, surrounding flow field and resulting negative drift. Hence e.g. a cost-efficient production of different wheel types that are aerodynamically optimized for different types of cars becomes possible.

A protective cover 25 according to the invention may also have the shape of an annular tape and only cover the outer part of the rim, as shown in FIGS. 20-21.

Non-limiting examples of embodiments of lay-ups of multi-layered protective covers 25 are shown in FIGS. 22-24. All layers are parallel to a u/v-plane, which is essentially normal to the local surface normals (w) of a protective cover 25. In one embodiment of a protective cover according to the invention, the lay-up may consist of 4 different functional layers as can be seen in FIG. 22. Each of these functional layers may be built-up of multiple layers itself. The top-most layer is a coating layer 29, which may be a clear coat or other finish. The next subjacent layer (in negative w-direction) in this embodiment of a protective cover 25 according to the invention is a decorative layer 30 which may e.g. be a carbon fiber fabric embedded in a transparent matrix or instead also a metal foil or a veneer. The next subjacent layer may be a shock absorber 31, which absorbs impact energy instead of transmitting it to the subjacent layers. Therefore e.g. hard foams or aramid fibers (Kevlar®) may be used. The bottom-most layer of the lay-up shown in FIG. 22 is a carrier structure 32 that increases the structural stability of the whole lay-up. Said carrier structure 32 may e.g. be a multilayered carbon fiber reinforced plastic. Another possible lay-up of a protective cover 25 according to the invention is shown in FIG. 23. In such an embodiment of a protective cover 25, no separate shock absorbing layer 31 is present. Instead, the carrier structure 32 may comprise at least one layers of a shock-absorbing aramid fabric.

In order to indicate damage of the protective cover 25 and/or the wheel 1, the protective cover 25 and/or the wheel 1 may comprise an inner layer which differs in color from an overlying layer and serves as damage indicating layer. This layer may be made out of a homogeneous material, such as e.g. a polymeric foil, or it may be a composite which contains fibers that differ in color from the fibers of the overlying layer. For a protective cover 25 or wheel 1 which has a top-most layer that comprises a fabric made out of carbon fibers, a damage indicating layer may comprise an aramid fabric (Kevlar®) or a blended fabric made out of e.g. carbon and aramid fibers. A lay-up for a protective cover 25 or a wheel 1 according to the invention may also comprise at least one additional damage indicating layer which is located under a first damage indicating layer. This at least one additional layer may differ in properties from the overlaying first damage indicating layer. Again, it may e.g. be a colored homogeneous foil or a fabric that comprises fiber with a color that differs from the overlying layers. Alternatively or in addition damage indicating layers may also comprise fibers which cannot be optically distinguished from other fibers with light in the visible spectrum but show fluorescence if illuminated with light at a certain wavelength. Hence such an alternative or additional layer for the indication of damage could be used for more in-depth assessments of damage by persons skilled in the art.

In one embodiment of the invention, edges of the wheel 1 (e.g. at the inner bead 6, outer bead 5 or boundary regions to the insert 2) are built by folding the lay-up, forming a hem-like border, as shown in FIG. 24. In FIG. 24 the outer bead 5 is built folding the whole laminar material is folded, forming a U-shaped hem, which may be open or closed. In an embodiment of the invention as shown in FIG. 24, the folded laminar material extends to the rim well and is used to form at least one rim well bead 33.

In an embodiment of the invention, the rim 4 may comprise reinforcing abrasion-resistant layers that prevent the underlying material from mechanical damage when mounting a tire.

A wheel 1 according to the invention may also comprise at least one layer made in a performing process. The preforming of the layer of material may comprise heating and/or deep drawing in a deep drawing tool and/or extruding in an extruding tool and/or injection molding in an injection molding tool and/or blow molding in a blow molding tool. As can be seen in FIG. 25 a wheel 1 may comprise multiple preformed layers, such as e.g. a preformed outer layer 35 on the outer side of a wheel 1, a preformed inner layer 36 on the inner side of a wheel 1 and preformed radial layers 37 at the rim well, preformed layers may be made out of different materials as well as they may have different thicknesses.

A wheel 1 may further comprise a failure detection system which e.g. may comprise a component that monitors internal tire pressure. Therefore in one embodiment of the invention a direct measurement of tire pressure or changes in tire pressure is done by a sensor unit attached to the rim. Alternatively or in addition, an optional component may monitor the structural integrity of a wheels inner bead 6 and/or outer bead 5 and/or spoke structure 3. Such a monitoring component may comprise at least one loop of an optical fiber that is embedded in the rim's inner 6 and/or outer beads 5 and/or spoke structure 3 which will have an altered light-loss when mechanically damaged. Alternatively or in addition, also the use of an electrical conductor is feasible according to the invention. In such an embodiment of a monitoring system, mechanical damage may be detected by changes in the electrical conductivity. Such an electrical conductor may also comprise a strain gauge element.

Means for failure detection 41, such as optical fibers or electrical conductors, may be embedded in pre-fabricated structures which in an RTM process may be placed in the mold during the lay-up of the fibers.

Alternatively or in addition, tire pressure as well as the structural integrity of the wheel may both be monitored in an indirect manner using information provided by sensors that may belong to a vehicle's electronic stability control (ESC) and/or anti-lock braking system (ABS). Using signal processing technology, changes in rotation frequencies of the wheel are analyzed and changes in wheel rotation that are characteristic for a specific type of damage of a wheel or the tire are identified using signal pattern recognition.

Alternatively or in addition, the wheel 1 may comprise at least one additional optical fiber or electrical conductor embedded in the rim 4 and/or spoke structure 3 and/or insert 2, which are not monitored in daily use but may be employed by a person skilled in the art for more sophisticated damage assessment and failure localization. The ends of such additional optical fibers and electrical conductors may protrude a wheels surface at the rim well and thus will only be accessible after removal of a tire.

The invention claimed is:

1. A wheel (1) for mounting to a hub, the wheel comprising:
   a rim (4); and
   a connected spoke structure (3) constructed of fiber reinforced plastic material and an insert (2) embedded n the fiber reinforced plastic material at a center of the spoke structure (3) and wherein the insert in at least one region protrudes above a surface of the fiber reinforced plastic material forming at least one contact area for contact with the hub, wherein the at least one contact area. (10, 14, 15) of the insert (2) is arranged in a radial and/or axial direction to interact with corresponding surfaces of the hub, wherein a bridge (11) is arranged between two contact areas (10, 14, 15), wherein the bridge (11) forms a recess and wherein fiber reinforced plastic material is arranged in the recess, and the fiber reinforced material forms a loop (12) around the bridge (11).

2. The wheel (1) according to claim 1, wherein the insert (2) comprises at least one fastening hole (8) foreseen to receive a bolt.

3. The wheel (1) according to claim 2, wherein a contact area (14, 15) is arranged adjacent to at least one end of the Fastening hole (8).

4. The wheel (1) according to claim 1, wherein the at least one contact area (14, 15) is aligned to a spoke of the spoke structure (3).

5. The wheel (1) according to claim 1, wherein the insert (2) comprises wing like elements, which are protruding outwardly to exchange a force with the spoke structure (3).

6. The wheel (1) according to claim 1, wherein the rim (4) is constructed of fiber reinforced plastic material.

7. The wheel (1) according to claim 6, wherein the rim (4) is integrally connected to the spoke structure (3).

8. The. wheel (1) according to claim 1, wherein the rim (4) is at least partially constructed of metal.

9. The wheel (1) according to claim 1, wherein the insert (2) is constructed of, plastic material and/or a ceramic material.

10. The wheel (1) according to claim 1, wherein the insert (2) is constructed of a fiber reinforced material.

11. The wheel (1) according to claim 1, wherein the insert (2) comprises at least one inlay (17), embedded in the insert (2) and protruding a surface of the insert in the fastening holes (8).

12. The wheel (1) according to claim 1, wherein at least one failure detection mean is embedded in the wheel (1) at an outer bead (5) and/or an inner bead (6) and/or a spoke region.

13. The wheel (1) according, to claim 12, wherein the at least one failure detection means comprises an optical fiber and/or a piezoelectric unit and/or an electrical wire and/or a strain gauge.

14. The wheel (1) according to claim 1, wherein an outer layer is constructed from a sheet-like plastic material.

15. The wheel (1) according to claim 14, wherein the sheet-like plastic material is made by deep drawing or injection molding or thermo forming.

16. The wheel (1) according to claim 1, wherein a protective cover (25) is interconnected to the wheel (1).

17. The wheel (1) according to claim 16, wherein the protective cover (25) is interconnected to the wheel (1) detachably.

18. A protective cover (25) for a wheel according to claim 16, wherein the protective cover (25) is made from a sheet like plastic material.

19. The protective cover (25) according to claim 18, wherein the protective cover (25) is constructed of a, fiber reinforced plastic.

20. The protective cover (25) according to claim 18, wherein the protective cover (25) comprises at least one air guide clement (34) which influences the surrounding air flow field of the wheel (1).

21. A method for producing a wheel (1) for mounting to a hub according to claim 1, said method comprising the following method steps:
 a. providing a mold comprising an upper and a lower part for forming the spoke structure and the inside of the rim and at least two slidable side parts for forming the outside of the rim is provided:
 b. placing fibers inside the mold in a predefined manner
 c. arranging an insert (2)in the mold so a region of the insert protrudes above a surface of a fiber reinforced plastic material to form a contact area for contact with the hub wherein the insert (2) is temporarily attached to and positioned by holding means of at least one mold part;
 d. placing additional fibers in the mold m predefined manner said fibers encompassing the insert(2)at least partially;
 e, closing the mold;
 f. introducing a resin into to the mold through injection openings:
 g. curing of the resin and the therein embedded fibers and insert (2);
 h. opening of the mold and removing the wheel (1).

22. The method according to claim 21, wherein the insert. (2) in a closed position of the mold is clamped between the upper and the lower mold part.

23. The method according to claim 21, wherein at least one outer layer of material is inserted into the mold.

24. The method according to claim 23, wherein the outer layer of material is formed by deep-drawing, injection molding or thermoforming.

25. The method according, to claim 24, wherein the outer layer of material is formed in an auxiliary tool.

26. The method according to claim 23, wherein the fibers and/or the insert (2) are applied to the outer layer of material outside of the mold.

\* \* \* \* \*